March 19, 1929.  H. R. SIMPSON  1,705,590
BOLT LOCK
Filed April 25, 1927
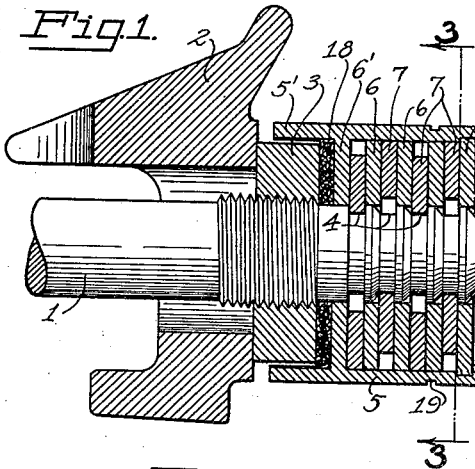
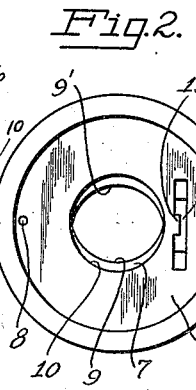
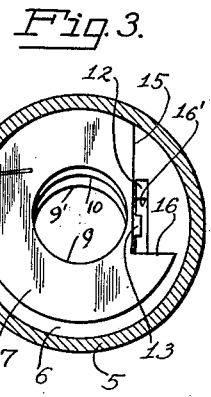
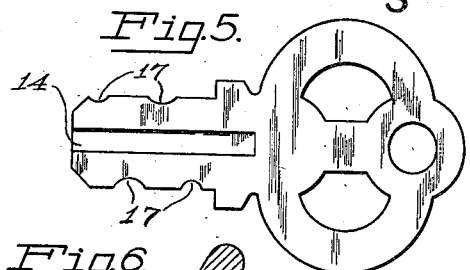
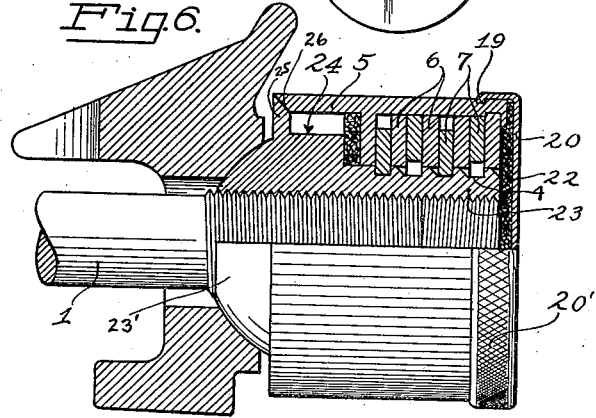
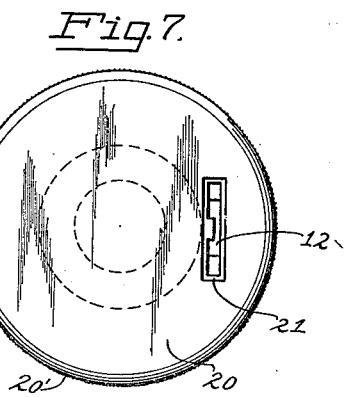
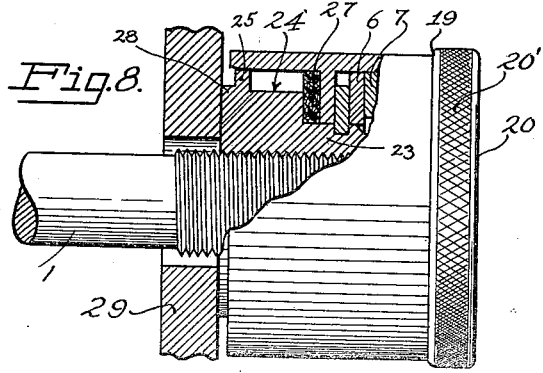
INVENTOR.
HIRAM R. SIMPSON
BY Miller & Boyken
His ATTORNEYS Patented Mar. 19, 1929.

1,705,590

UNITED STATES PATENT OFFICE.

HIRAM R. SIMPSON, OF SAN FRANCISCO, CALIFORNIA, ASSIGNOR TO BOYD V. VON SENDEN, THEODORE HARDEE, AND GUY N. BJORGE.

BOLT LOCK.

Application filed April 25, 1927. Serial No. 186,555.

This invention relates to tumbler locks in general, and in particular to such a lock which may be slipped over the end of a round article such as a bolt, and lock therewith.

The objects of the invention are to provide a lock of this kind which is simple in construction, yet difficult to pick, is proof against the ordinary causes of lock impairment such as dust and mud, and such a lock which may be used with a common bolt to lock its nut in place, or which will provide within itself the nut so that it may be applied to a bolt in place of the usual nut, all particularly for use on automobile equipment such as for locking the tire on one or more of its rim bolts, or locking the spare tire on a bolt, or locking any nut on any bolt for any purpose.

In the drawings hereto Fig. 1 is a longitudinal cross section of my improved bolt lock shown applied to a rim lug bolt of an automobile. Fig. 2 is an end view of the lock and Fig. 3 a sectional view of Fig. 1 as seen from the arrows designated 3 thereon, while Fig. 4 is a plan view of the second tumbler and Fig. 5 is a plan view of a key for the lock of Fig. 1.

Fig. 6 shows in longitudinal half-section a modified form of my lock embracing a contained nut applied to a common tire lug bolt. Fig. 7 is an end view of the lock of Fig. 6 showing the revolvable escutcheon, and Fig. 8 is a broken sectional side view of a lock similar to that shown in Fig. 6 but equipped with a slightly different dirt seal.

Briefly described my lock comprises a cylindrical barrel or shell containing a series of alternating fixed and movable plates with a central hole extending clear through all the plates for the axial reception of a bolt. The bolt to have parallel grooves around it aligned with the movable plates and which fall through spring action from opposite sides into the grooves so as to lock the device to the bolt. To release the bolt a key is inserted through an opening passing through all of the plates and which key is so shaped that once it is home its features at once align all the plates and the central holes thereby freeing the movable or tumbler plates from the grooves and permitting axial removal of the lock from the bolt.

In the drawings, first with respect to Figs. 1 to 5 the bolt is designated 1 and is here shown as passing through a rim-lug 2 and bolted thereagainst by a common hex nut 3. The bolt from the nut 3 outward is reduced in diameter to remove the thread and formed with a series of parallel grooves 4 extending around the bolt and each groove having a rearwardly slanted rear wall forming thereby a series of ratchet-like grooves to prevent withdrawal axially of the bolt of anything which might resiliently engage them at right angles to the axis of the bolt.

The cylindrical shell 5 of the lock has a rear portion 5' which extends freely over the hex nut 3 so that it may revolve thereover without turning the nut, while within the shell are the alternating fixed (6) and movable (7) plates mentioned, the rearmost fixed plate 6' being preferably an integral portion of the shell.

All of the plates have a central hole to slide nicely over the bolt when all holes are aligned.

The fixed plates are of a diameter to just fit within the shell 5 and are held from rotation by a pin 8 passing through all of the plates and preferably riveted permanently to the rearmost fixed plate, while the outermost fixed plate is also retained in place by the shell being spun over its outer edge as indicated.

The movable or tumbler plates are round disks of smaller diameter than the inside of the shell, loosely positioned between the fixed plates and are each pivoted to the pin 8 so as to be rockable thereon past the central position both ways until they strike the shell to thereby displace their central holes 9—9' out of alignment with the central holes 10 of the fixed plates, and when so displaced they project each into one of the grooves of the bolt.

To thus throw the plates out of alignment with the fixed plates, each movable plate is provided with a thin flat spring 11 projecting from its periphery and bearing against the inside of the shell so as to resiliently force the plate to which it is attached away from the spring to the opposite side of the shell as indicated in Fig. 3.

In assembling the lock these movable plates are preferably inserted with their springs pressed against opposite sides of the shell alternatingly with each disk so that one disk will engage the bolt from one side and the next disk from the opposite side, then when the lock as described is simply pushed over the bolt, due to the slanted rear wall or corner of each groove and chamfered forward end of the bolt as shown, the plates will snap into one groove after the other until the device is in as far as it will go and each of the loose or pivoted plates has engaged a groove in the bolt, thus firmly locking the device in place.

To align the disks and central hole so that the device can be removed from the bolt, I provide an aligned key-hole 12 through all of the fixed disks and suitably warded by any number of wards as at 13 and into which key-hole a counter warded flat key 14 is adapted to fit.

The movable disks are alternately notched out right and left (as positioned in the lock) as indicated at 15 so as to present oppositely directed tumbler shoulders 16—16' extending within the end walls of the fixed plate key-hole to interfere with the insertion of a key. However the key being beveled at its entering corners thrusts the movable plates outward as it is inserted and when fully home permits the plates to fall inward and seat themselves against its tumbler aligning notches 17, it being understood that these notches are of various depths complementary to various positions of the tumbler shoulders 16—16', so that when all movable plates are seated in their proper key notches, the central bolt holes in all plates will be perfectly aligned so that the lock may be freely removed from the bolt.

It will be clear from what has been explained that if a notch for any of the tumbler plates is too deep the plate will spring inward too far and instead of its hole being aligned with the bolt holes of the other plates it will simply have re-engaged the groove from the opposite side, hence the notches must be exactly right, neither too shallow nor too deep, or else the lock will not be released.

It is also clear that the plates may be very thin and that any number of them may be used so as to get many variations to the key, or give the square of their sum of changes with a given set of tumbler plates, and of course which number is again doubled by a slight shifting of the shoulder 16 of any one plate.

In Fig. 1 at 18 is shown a soft felt washer lying between the inner fixed plate 6 and the nut 3 so as to exclude any dirt from getting into the lock from the rear end, while in places where dirt is liable to gain entrance to the forward end or key hole, a revolvable escutcheon may be spun into the bezel groove 19 as shown in Figs. 6, 7 and 8, the escutcheon being omitted in Fig. 1 for clarity.

In Figs. 6, 7 and 8 a similar lock is shown except that the groove 19 of the cylinder 5 has spun into it the edge of an escutcheon disk 20 provided with an opening 21 adapted to reveal the keyhole 12 as shown in Fig. 7 upon revolving the disk by means of the milled edge 20' and to close off and seal the keyhole when otherwise positioned than as shown in the drawing. A felt washer 22 secured to the escutcheon between it and the other fixed plate of the lock insures that no mud or water will enter the keyhole when the disk is turned to close it.

In Figs. 6 and 8 the lock embodies an internal sleeve portion 23 which takes the place of the nut 3 shown in Fig. 1 and makes special forming of the bolt unnecessary as the sleeve embodies the groove features 4 formed on the bolt itself in Fig. 1, as clearly indicated on the drawing.

The sleeve is threaded internally for the bolt 1 and has a hexagon portion 24 adapted for application of a wrench for screwing it up tightly against any object while above this extends a flange 25 beveled at 26 to seat against a similar bevel on the cylindrical shell 5 so as to form a dirt seal while permitting free revolution of the cylinder upon the sleeve 23 when the device is locked thereto. In this showing the sleeve 23 terminates in back of the washer or flange 25 in a convex portion 23' adapted to seat within a concave socket as provided on some makes of rim-lugs, tho if desired this convex portion may be loose from the balance of the sleeve on line with the rear of the flange 25 so that it may be used or not at will.

In Fig. 8 the construction is similar to that described for Fig. 6 except that the shell 5 fits smoothly over the flange 25 and has an additional felt washer at 27 to seal the mechanism from dirt, while at the rear of the flange 25 on sleeve 23 a plain boss 28 is provided for taking the thrust against the work 29.

In operation the lock is applied by pushing axially in place and cannot be pulled off again until a proper key is pushed into place. This key of course releases without turning, and on account of the slanted notches may be inserted under the rising and falling tumbler plates in the same manner as the key for any pin tumbler lock.

When locked in place the lock is perfectly free to revolve either on the bolt (in case of Fig. 1) or the sleeve (in case of Figs. 6 and 8) so that the nut covered by it cannot be grasped with a wrench to unscrew it, thus securely locking the nut against tampering, and while I show a lock applied to the end of a bolt I believe my system of disk tumbler plates is in itself new as well as several other features of the lock which may have application to other locks and accordingly I intend to claim hereunder the whole combination as well as such separate parts thereof as in my experience might be appropriated in other structures and carry with them some of the advantages of my invention.

I claim:

1. A lock comprising a shell provided internally with spaced plates having coinciding apertures, movable plates between said spaced plates having coincidable apertures, means for displacing the movable plates for misaligning their apertures with those of the spaced plates, aligned keyholes in said spaced plates adapted to receive a key in simultaneous extension through the plates, and tumbler shoulders formed on each of said movable plates adapted to cooperate with a key in said keyholes for restoring alignment of the movable plates.

2. A bolt lock comprising a sleeve nut threaded internally for the bolt, a casing adapted to position axially over said sleeve nut, means for locking the casing to the nut against axial removal while permitting free rotary movement relative thereto.

3. In a structure as specified in claim 2 cooperating means on said sleeve nut and casing for sealing the members against admission of dirt while permitting said rotary movement.

4. In a structure as specified in claim 2 cooperating means on said sleeve nut and casing for sealing the members against admission of dirt while permitting said rotary movement and including a revolvable escutcheon cover plate over the end of said casing adapted for exposing and closing a key hole extending into the interior of said casing.

5. In a structure as specified in claim 2 said sleeve nut provided with a convexly shaped rear end.

6. A lock provided with a circular face with a keyhole extending therein, an escutcheon plate covering said face revolvably secured to the lock and having an opening adapted to be brought over said keyhole.

7. A lock provided with a circular face with a keyhole extending therein, an escutcheon plate covering said face revolvably secured to the lock and having an opening adapted to be brought over said keyhole and a gasket positioned under said escutcheon plate.

8. A lock having a circular bore, a plurality of spaced disks fitting said bore having each a coinciding central hole, a plurality of disks intermediate said spaced disk of smaller external diameter than said bore each having a central hole adapted to coincide with the holes in the spaced disks, the intermediate disks being pivoted at one side of their holes to the spaced disks so as to be shiftable for misaligning the holes, springs on the pivoted disks bearing against the wall of the bore for shifting the disks, and key operated means on the disks opposite the pivoted point adapted for aligning the intermediate disks so as to bring all said holes in coincidence.

HIRAM R. SIMPSON.